United States Patent [15] 3,689,554
Ley et al. [45] Sept. 5, 1972

[54] HYDRAZONES
[72] Inventors: Kurt Ley, Odenthal-Globusch; Ernst Roos, Cologne, Flittard; Theo Kampermann, Cologne, Lindenthal; Roland Nast, Cologne, Buchheim, all of Germany
[73] Assignee: Farbenfabriken Bayer Aktiengesellschaft, Leverkusen, Germany
[22] Filed: Aug. 15, 1969
[21] Appl. No.: 850,637

[52] U.S. Cl............260/557 H, 260/804, 260/45.9 R
[51] Int. Cl.............................................C07c 109/18
[58] Field of Search..........................260/557 H, 804

[56] References Cited
UNITED STATES PATENTS
3,095,448   6/1963   Biel........................260/558 H Primary Examiner—Henry R. Jiles
Assistant Examiner—S. D. Winters
Attorney—Connolly and Hutz

[57] ABSTRACT

Compounds of the formula

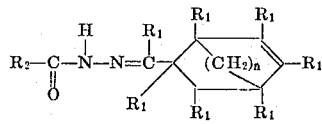

wherein $R_1$ is hydrogen or methyl, n is 0 or 1 and $R_2$ is

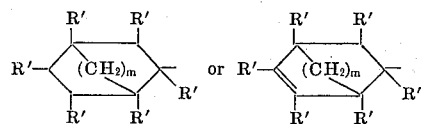

wherein $R'$ is hydrogen or methyl and m is 0 or 1 and their utility as anti-ozonants in natural and synthetic rubbers.

5 Claims, No Drawings

HYDRAZONES

Vulcanizates of natural or synthetic rubber are known to develop cracks when their surface is under mechanical stress and exposed to atmospheric influences. The mechanical stress may be both constant in time, static, and periodically variable, dynamic. It is known that the ozone occurring in low concentrations in the atmosphere is responsible for these cracks, and the extent of resistance against this type of crack development varies with the elastomer identity. For example, completely or substantially saturated elastomers such as silicone rubber or butyl rubber are highly resistant to degradation phenomena such as these. By contrast, natural rubber is most susceptible to cracking.

It is known that vulcanizates of rubber elastomers can be effectively protected against the development of cracks under the influence of ozone by the incorporation of derivatives of p-phenylene diamine such as N-isopropyl-N'-phenyl-p-phenylene diamine and N-(1,3-dimethylbutly)-N'-phenyl-p-phenylene diamine.

The aforesaid p-phenylene diamine derivatives and similar anti-ozonants exert their effect by chemically reacting with ozone or with the primary ozonization products of rubber by a mechanism which is not known in detail but which deactivates the products promoting the development of cracks. It is also known that rubber can be protected against the effect of ozone by other methods, namely, by incorporating mixtures of macrocrystalline and microcrystalline waxes. By virtue of their partial insolubility, these waxes form a protective film over the surface of the vulcanizate which prevents the ozone molecules from penetrating and thereby prevents actual chemical reaction from taking place.

One disadvantage of the aforesaid p-phenylene diamines is their marked tendency towards discoloration. In cases where vulcanizates containing these products are exposed to light, they undergo a change in color varying from reddish-brown to brown-black. One disadvantage of using waxes is that the protective film can be broken, for example, when it is subjected to bending. In this case, deep ozone cracks are immediately formed.

It has now been found that compounds corresponding to the formula

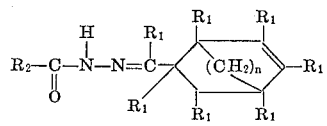

wherein $R_1$ is hydrogen or methyl; n is 0 or 1 and $R_2$ is

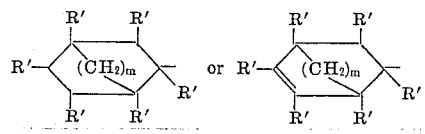

wherein R' is hydrogen or methyl and m is 0 or 1 are suitable for use as anti-ozonants for natural rubber or synthetic unsaturated rubber. These compounds do not exert their effect through the development of a protective film like the wax anti-ozonants, but through a chemical mechanism. In other words, they do not have the disadvantage which is reflected in the development of cracks when the vulcanizate is subjected to flexing.

In addition, the novel products do not discolor and accordingly do not suffer from the well-known disadvantage of the aforesaid derivatives of p-phenylene diamine.

The following products are typical examples of the additives used in accordance with the invention:

TABLE 1

1. (1,2,5,6-tetrahydrobenzaldehyde)-hexahydrobenzoyl-hydrazone
2. (1,2,5,6-tetrahydro-4-methyl-benzaldehyde)-hexahydro-benzoyl-hydrazone
3. (1,2,5,6-tetrahydrobenzaldehyde)-(1',2',5',6'-tetrahydrobenzoyl)-hydrazone
4. (1,2,5,6-tetrahydro-2- or 5-methyl-benzaldehyde)-(1',2',5',6'5. (1,2,5,6-tetrahydro-1-methyl-benzaldehyde-1',2',5',6'-tetrahydrobenzoyl)-hydrazone
1',2',5',6'-tetrahydrobenzoyl)-hydrazone
6. (1,2,5,6-tetrahydro-4-methyl-benzaldehyde)-(1',2',5',6'-tetrahydrobenzoyl)-hydrazone
7. (1,2,5,6-tetrahydrobenzaldehyde)-(1',2',5',6'-tetrahydro-4'-methyl-benzoyl)-hydrazone
8. (1,2,5,6-tetrahydro-4-methyl-benzaldehyde)-(1',2',5',6'-tetrahydro-4'-methyl-benzoyl)-hydrazone
9. (1,2,5,6-tetrahydrobenzaldehyde)-(1',2',5',6'-tetrahydro-1'-methyl-benzoyl)-hydrazone
10. (1,2,5,6-tetrahydrobenzaldehyde)-(1',2',5',6'-tetrahydro-2 or 5-methyl-benzoyl)-hydrazone
11. (1,2,5,6-tetrahydro-2,5-endomethylene-benzaldehyde)-(1',2',5',6'-tetrahydro-2',5'-endomethylene-benzoyl)-hydrazone
12. (1,2,5,6-tetrahydro-acetophenone)-1',2',5',6'-tetrahydro-benzoyl)-hydrazone
13. (1,2,5,6-tetrahydro-3 or 4-methyl-acetophenone)-(1',2',5',6'3'or 4'-methyl-benzoyl)-hydrazone
14. (1,2,5,6-tetrahydro-2,5-endomethylene-acetophenone)-(1',2',5',6'-tetrahydro-2',5'-endomethylene-benzoyl)-hydrazone The agents of the present invention can be satisfactorily processed with rubber and, when used in quantities sufficient to give the desired protective effect, do not show any efflorescence and hence, unlike the aforementioned waxes, no "breakage" of the protective film.

The processing of the rubber mixtures is not adversely influenced by the agents of the present invention. In particular, plasticity and pre-vulcanization behavior remain the same when the agents of this invention are added. However, the mechanical properties of the vulcanizate are affected to a limited extent. The degree of crosslinking decreases slightly, and this is reflected in a reduction in the stress value. However, this can readily be corrected without including other disadvantages by the addition of a vulcanization accelerator such as dibenzoyl disulphide and/or sulphur during the mixing process in quantities of up to 0.5 parts per hundred parts of rubber, based on the weight of the rubber.

The compounds according to the invention are generally added in quantities of from 0.3 to 5.0 parts per hundred parts of rubber, based on the weight of the rubber, preferably, in quantities of from 0.5 to 3.0 parts per hundred parts of rubber. Other antiagers may be included.

The anti-ozonants used in accordance with the invention may be employed in natural rubber and synthetic unsaturated elastomers containing double bonds, for example, in polymers of butadiene, isoprene, dimethyl butadiene and their homologs, also in copolymers of conjugated diolefins with polymerizable vinyl compounds such as, for example, styrene, methyl styrene, divinyl benzene, acrylonitrile, methacrylonitrile, acrylates or methacrylates and copolymers obtained from iso-olefins such as isobutylene or its homologs and small quantities of conjugated diolefins. It is also possible to protect polymers of the kind obtained from chlorobutadiene and copolymers of chlorobutadiene with mono- and/or diolefins or polymerizable vinyl compounds.

The hydrazide hydrazones employed in accordance with the invention may be prepared, for example, by reacting the corresponding hydrazides with aldehydes or ketones. The procedure usually adopted is to react 1 mol of the hydrazide with 1 mol of the aldehyde or ketone in an organic solvent such as, for example, ethanol, methanol, isopropanol, acetonitrile, dimethyl formamide, benzene, cyclohexane or light gasoline at a temperature of from 10° C. to 100° C., the hydrazide hydrazones being formed in an exothermic reaction. They are worked up in the usual way. The water formed during the reaction may optionally be removed by azeotropic distillation.

The invention is illustrated by the following Examples in which the parts indicated are by weight.

EXAMPLE 1

Mixtures of the following compositions for the treads of automobile tires were prepared on mixing rolls:

|  | A | B | C | D | E |
|---|---|---|---|---|---|
| Oil-extended butadiene-styrene rubber (37.5 parts by weight of oil to 100 parts by weight of rubber) | 100.0 | 100.0 | 100.0 | 100.0 | 100.0 |
| Zinc oxide | 5.0 | 4.0 | 5.0 | 5.0 | 5.0 |
| Mineral oil plasticizer | 4.0 | 4.0 | 4.0 | 4.0 | 4.0 |
| highly abrasion-resistant furnace black | 55.0 | 55.0 | 55.0 | 55.0 | 55.0 |
| Stearic acid | 2.0 | 2.0 | 2.0 | 2.0 | 2.0 |
| 2-benzthiazyl-N-cyclohexyl sulphenamide | 1.3 | 1.3 | 1.3 | 1.3 | 1.3 |
| Sulphur | 1.6 | 1.6 | 1.6 | 1.6 | 1.6 |
| Compound 1 of Table 1 | — | 2.0 | — | — | — |
| Compound 2 of Table 1 | — | — | 2.0 | — | — |
| Compound 7 of Table 1 | — | — | — | 2.0 | — |
| Compound 8 of Table 1 | — | — | — | — | 2.0 |

Test specimens prepared from these mixtures measuring 0.4 × 4.5 × 4.5 cm were vulcanized in a press for 30 minutes at 151° C. The test specimens were then fixed in a plastic frame in such a way that elongations of 10 percent, 20 percent and 30 percent respectively, were produced across their surfaces. The test specimens thus bent were weathered for three months in a southerly direction without any cover. Crack development was evaluated at certain intervals as specified in the following Table, by counting the total number of cracks visible with the naked eye and also by measuring their average length and then assigning ratings defined as follows:

| Number of Cracks | Rating | Average Length of Cracks | Rating |
|---|---|---|---|
| No cracks | 0 | No result | 0 |
| 1 to 3 cracks | 1 | Cracks just visible up 1 mm | 1 |
| 4 to 9 cracks | 2 | 1 to 3 mm | 2 |
| 10 to 27 cracks | 3 | 3 to 8 mm | 3 |
| 28 to 81 cracks | 4 | Longer than 8 mm | 4 |
| 82 to 243 cracks | 5 |  |  |
| More than 244 cracks | 6 |  |  |

Both ratings are reported in the following Table, the rating for the number of cracks being reported first, followed by the average length rating.

| Elongation % | Days Weathered Prior to Evaluation | | | | | |
|---|---|---|---|---|---|---|
|  | 0 | 2 | 8 | 20 | 50 | 100 |
| Vulcanizate A (control) | | | | | | |
| 10 | 0/0 | 2/1 | 4/1 | 4/2 | 4/2 | 4/3 |
| 20 | 0/0 | 4/1 | 5/1 | 5/2 | 5/3 | 5/3 |
| 30 | 0/0 | 5/1 | 6/1 | 6/2 | 6/2 | 6/2 |
| Vulcanizate B | | | | | | |
| 10 | 0/0 | 0/0 | 0/0 | 0/0 | 0/0 | 0/0 |
| 20 | 0/0 | 0/0 | 0/0 | 0/0 | 0/0 | 0/0 |
| 30 | 0/0 | 0/0 | 3/1 | 3/2 | 3/2 | 4/2 |
| Vulcanizate C | | | | | | |
| 10 | 0/0 | 0/0 | 0/0 | 0/0 | 0/0 | 0/0 |
| 20 | 0/0 | 0/0 | 0/0 | 0/0 | 0/0 | 0/0 |
| 30 | 0/0 | 0/0 | 0/0 | 0/0 | 0/0 | 2/4 |
| Vulcanizate D | | | | | | |
| 10 | 0/0 | 0/0 | 0/0 | 0/0 | 0/0 | 0/0 |
| 20 | 0/0 | 0/0 | 0/0 | 0/0 | 0/0 | 1/2 |
| 30 | 0/0 | 0/0 | 0/0 | 0/0 | 0/0 | 3/2 |
| Vulcanizate E | | | | | | |
| 10 | 0/0 | 0/0 | 0/0 | 0/0 | 0/0 | 0/0 |
| 20 | 0/0 | 0/0 | 0/0 | 0/0 | 0/0 | 0/0 |
| 30 | 0/0 | 0/0 | 0/0 | 0/0 | 0/0 | 2/3 |

The agents of the present invention did not cause any discoloration upon contact with the formulations specified in Example 1. In addition, compounds 1, 2, 7 and 8 were incorporated in a pure white mixture based on light crepe, vulcanized in the usual way, and the vulcanizates were exposed to direct sunlight for a period of 2 months. There was no sign of any discoloration, i.e., the color of the vulcanizates were the same as the control having no added agents.

EXAMPLE 2 a. 77.4 g. (0.71 mol) of 1,2,5,6-tetrahydrobenzaldehyde are added dropwise with stirring at 50° C. to a suspension of 80 g. (0.71 mol) of hexahydrobenzoic acid hydrazide. There is a rise in temperature to 56° C., the hydrazide enters into solution and, after a short while, a crystalline deposit is precipitated. The product is stirred for 1 hour, cooled, suction-filtered and washed with light gasoline. 120 g. of 1,2,5,6-tetrahydrobenzaldehyde hexahydro-benzoyl hydrazone (Compound 1 from Table 1) is obtained in the form of colorless crystals. After dissolution in, and reprecipitation from methanol, this product melts at from 171° C. to 173° C.

b. In addition to benzene, light gasoline, methanol, isopropanol or acetonitrile may be used as solvents for the reaction described in Example 2a. The water formed during the reaction may optionally be removed by azeotropic distillation.

The removing agents of the present invention are prepared as in Example 2a. Typical examples are presented in the following Table.

| Compound (Table 1) | Hydrazide hydrazine | Hydrazide | Carbonyl component | M.P. (° C.) |
|---|---|---|---|---|
| 2 | | | | 182–184 |
| 7 | | | | 178–180 |
| 8 | | | | 188–190 |

What is claimed is:

1. A compound of the formula

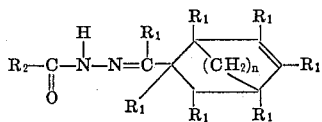

wherein $R_1$ is hydrogen or methyl, n is 0 or 1 and $R_2$ is

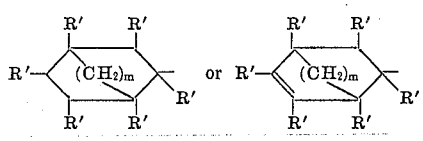

wherein $R'$ is hydrogen or methyl and m is 0 or 1.

2. The compound of claim 1 having the formula

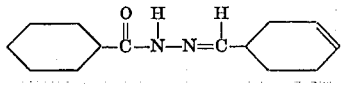

3. The compound of claim 1 having the formula

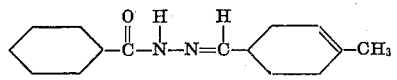

4. The compound of claim 1 having the formula

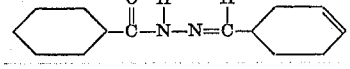

5. The compound of claim 1 having the formula

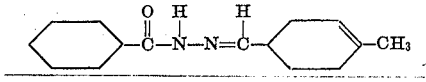

* * * * *

UNITED STATES PATENT OFFICE
CERTIFICATE OF CORRECTION

Patent No. 3,689,554                    Dated September 5, 1972

Inventor(s) Kurt Ley, Ernst Roos, Theo Kempermann and Roland Nast

It is certified that error appears in the above-identified patent and that said Letters Patent are hereby corrected as shown below:

The format page, line 3 under item [72], "Kampermann" should read -- Kempermann --.

Col. 1, line 20, "dimethylbutly)" should read -- dimethylbutyl) --.

Col. 2, lines 16-19, should read -- 4.(1,2,5,6-tetrahydro-2- or 5-methylbenzaldehyde)-(1',2',5',6'-tetrahydrobenzoyl)-hydrazone --;

line 20, should read -- 5.(1,2,5,6-tetrahydro-1-methyl-benzaldehyde)-(1',2',5',6'-tetrahydrobenzoyl)-hydrazone --;

lines 37-39, should read -- 13.(1,2,5,6-tetrahydro-3- or 4-methyl-acetophenone)-(1',2',5',6'-tetrahydro-3' or 4'-methyl-benzoyl)-hydrazone --.

Col. 4, line 21, "%" should read -- O/O --.

Col. 6, the formula of claim 4 should read

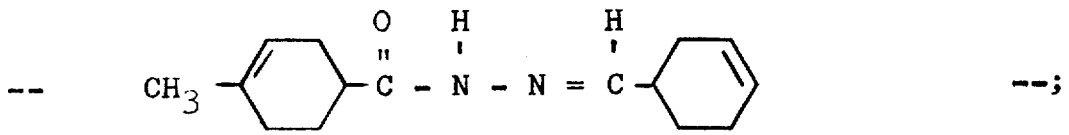

the formula of claim 5 should read

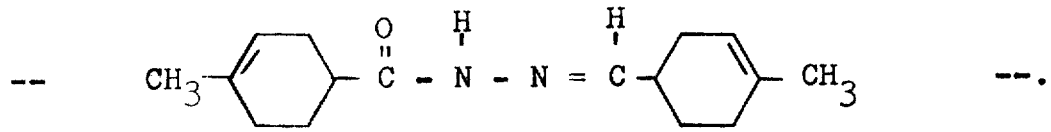

Signed and sealed this 6th day of March 1973.

(SEAL)
Attest:

EDWARD M. FLETCHER, JR.
Attesting Officer

ROBERT GOTTSCHALK
Commissioner of Patents